(12) United States Patent
Kim et al.

(10) Patent No.: US 11,595,862 B2
(45) Date of Patent: Feb. 28, 2023

(54) SIGNALING DELAY HANDLING FOR HANDOVER

(71) Applicant: LG ELECTRONICS INC., Seoul (KR)

(72) Inventors: Hongsuk Kim, Seoul (KR); Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 17/268,067

(22) PCT Filed: Sep. 30, 2019

(86) PCT No.: PCT/KR2019/012702
§ 371 (c)(1),
(2) Date: Feb. 11, 2021

(87) PCT Pub. No.: WO2020/067826
PCT Pub. Date: Apr. 2, 2020

(65) Prior Publication Data
US 2021/0314828 A1    Oct. 7, 2021

(30) Foreign Application Priority Data
Sep. 28, 2018   (KR) .......................... 10-2018-0115553

(51) Int. Cl.
*H04W 36/00* (2009.01)
*H04W 4/40* (2018.01)

(52) U.S. Cl.
CPC ......... *H04W 36/0058* (2018.08); *H04W 4/40* (2018.02); *H04W 36/0079* (2018.08); *H04W 36/00837* (2018.08)

(58) Field of Classification Search
CPC ............. H04W 36/0079; H04W 36/08; H04W 36/24; H04W 36/36
See application file for complete search history.

(56) References Cited

U.S. PATENT DOCUMENTS

| 2012/0302243 A1 | 11/2012 | Park et al. |
| 2015/0208290 A1 | 7/2015 | Seo et al. |
| 2018/0007603 A1 | 1/2018 | Miranda et al. |
| (Continued) | | |

FOREIGN PATENT DOCUMENTS

| WO | 2011091443 | 7/2011 | |
| WO | WO-2019029015 A1 * | 2/2019 | ........ H04W 36/0016 |

OTHER PUBLICATIONS

PCT International Application No. PCT/KR2019/012702, International Search Report dated Jan. 10, 2020, 3 pages.
(Continued)

*Primary Examiner* — Nam T Huynh
(74) *Attorney, Agent, or Firm* — Lee Hong Degerman Kang Waimey

(57) ABSTRACT

A method and apparatus for handling signaling delay for handover is provided. A wireless device transmits a measurement report based on a first event for a first cell, receives a handover command which commands a handover to the first cell, and checks validity of the handover command based on the first event for the first cell and/or a second event for a second cell other than the first cell.

12 Claims, 14 Drawing Sheets

(56) References Cited

U.S. PATENT DOCUMENTS

2020/0045602 A1* 2/2020 Jiang ................ H04W 36/305
2021/0235336 A1* 7/2021 Martin .............. H04W 36/0077

OTHER PUBLICATIONS

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.7.0, Jun. 2018, 5 pages.

3rd Generation Partnership Project, "Technical Specification Group Radio Access Network; NR; NR and NG-RAN Overall description; Stage 2 (Release 15)," Section 9.2.3.2 of 3GPP TS 38.300 V15.2.0, Jun. 2018, 87 pages.

3rd Generation Partnership Project, "Technical Specification Group Radio Access Network; NR; Radio Resource Control (RRC) protocol specification (Release 15)," Sections 5.3.5.1, 5.3.5.5.2, 5.5.1, and 5.5.4 of 3GPP TS 38.331 V15.2.0, Jun. 2018, 304 pages.

Thales, "Study on solutions evaluation for NR to support Non Terrestrial Network," 3GPP TSG RAN meeting #80, RP-181370, Jun. 2018, 5 pages.

3rd Generation Partnership Project, "Technical Specification Group Radio Access Network; Solutions for NR to support non-terrestrial networks (NTN) (Release 16)," 3GPP TR 38.821 V0.1.0, Sep. 2018, 18 pages.

\* cited by examiner

SIGNALING DELAY HANDLING FOR HANDOVER

CROSS-REFERENCE TO RELATED APPLICATIONS

This application is the National Stage filing under 35 U.S.C. 371 of International Application No. PCT/KR2019/012702, filed on Sep. 30, 2019, which claims the benefit of earlier filing date and right of priority to KR Application No. 10-2018-0115553, filed on Sep. 28, 2018, the contents of which is hereby incorporated by reference herein in its entirety.

TECHNICAL FIELD

The present disclosure relates to handling signaling delay for handover.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

It has been discussed to support Non-Terrestrial Network (NTN) in 5G NR. The NTN is commonly used to support transport, public safety, media and entertainment, eHealth, energy, agriculture, finance, automotive, etc. The expected roles of NTN may be:

- to foster the roll out of 5G service in un-served areas that cannot be covered by terrestrial 5G network (isolated/remote areas, on board aircrafts or vessels) and under-served areas (e.g. sub-urban/rural areas) to upgrade the performance of limited terrestrial networks in cost effective manner;
- to reinforce the 5G service reliability by providing service continuity for Machine-to-Machine (M2M)/Internet-of-Things (IoT) devices or for passengers on board moving platforms (e.g. passenger vehicles-aircraft, ships, high speed trains, bus) or ensuring service availability anywhere especially for critical communications, future railway/maritime/aeronautical communications: and
- to enable 5G network scalability by providing efficient multicast/broadcast resources for data delivery towards the network edges or even user terminal.

SUMMARY

Even though there are some beneficial point to apply NTN service in 5G NR, there are also several issues that need to be addressed. As one of the several issues, propagation delay should be considered. More specifically, signaling delay for handover in NTN should be handled.

In an aspect, a method performed by a wireless device in a wireless communication system is provided. The method includes transmitting a measurement report based on a first event for a first cell, receiving a handover command which commands a handover to the first cell, and checking validity of the handover command based on the first event for the first cell and/or a second event for a second cell other than the first cell.

In another aspect, an apparatus for implementing the above method is provided.

The present disclosure can have various advantageous effects.

For example, a wireless device can inform a network that a mobility to a cell which is no more applicable due to propagation delay is invalid.

For example, the wireless device can prevent additional handover failure by not perform mobility to a cell which is no more applicable to perform mobility.

For example, handover failure rate can be reduced and terminal service delay can be minimized by preventing improper mobility procedures due to propagation delays that can occur frequently due to satellite service.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
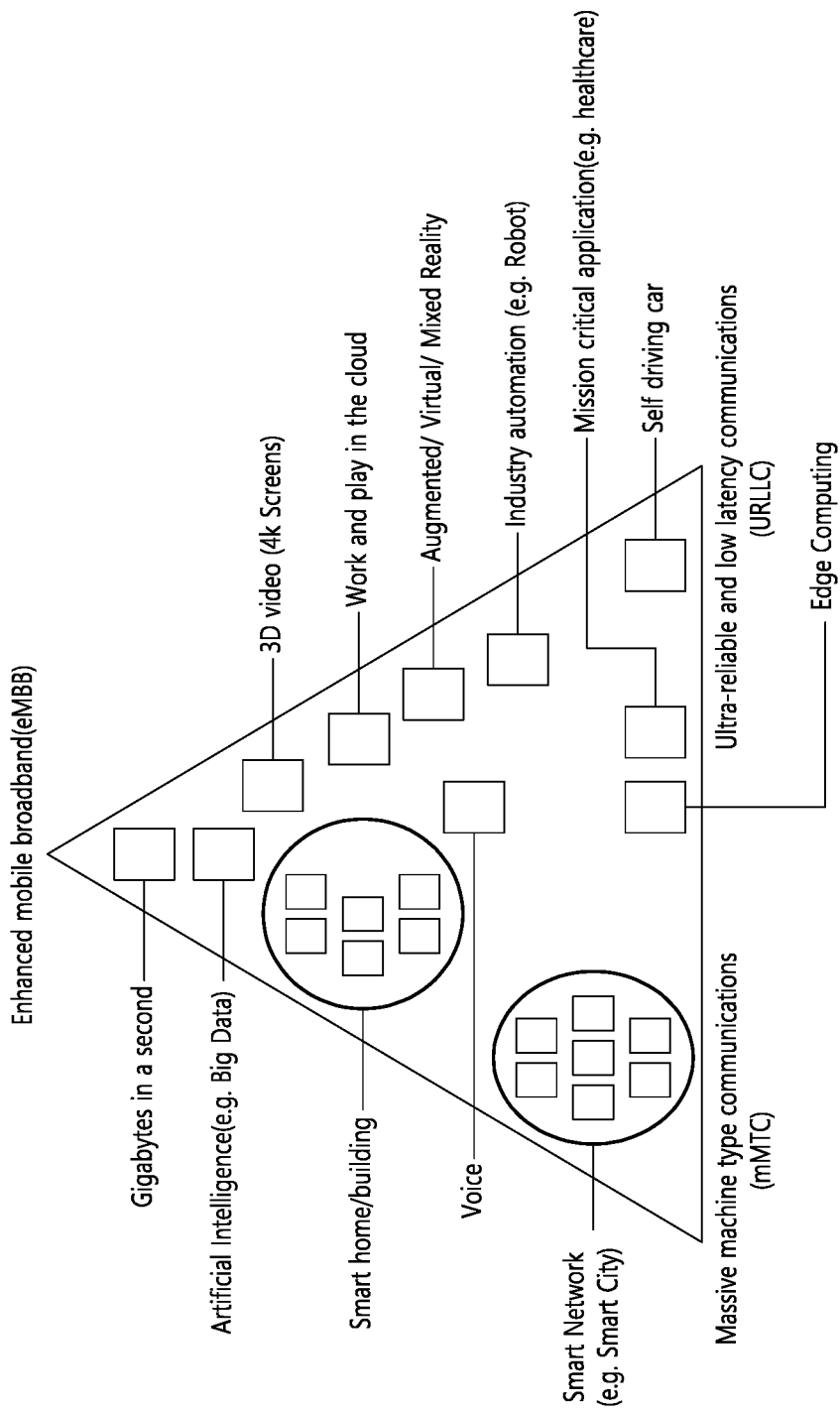
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
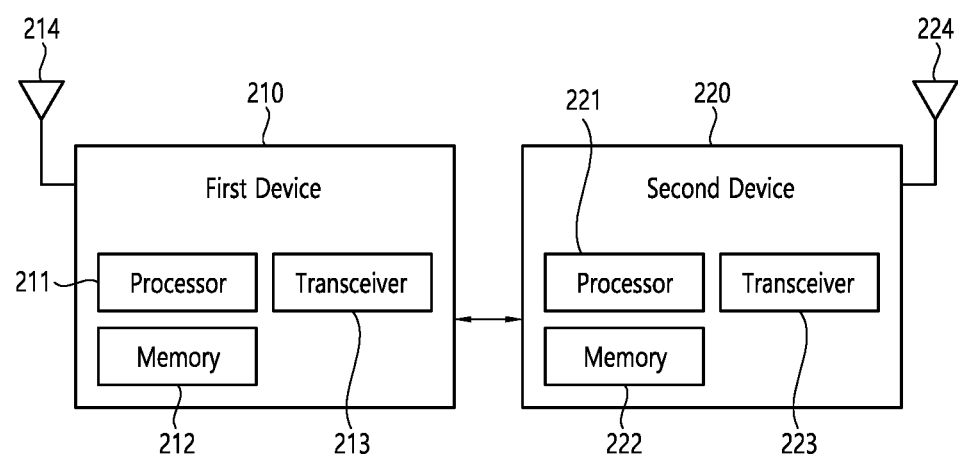
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
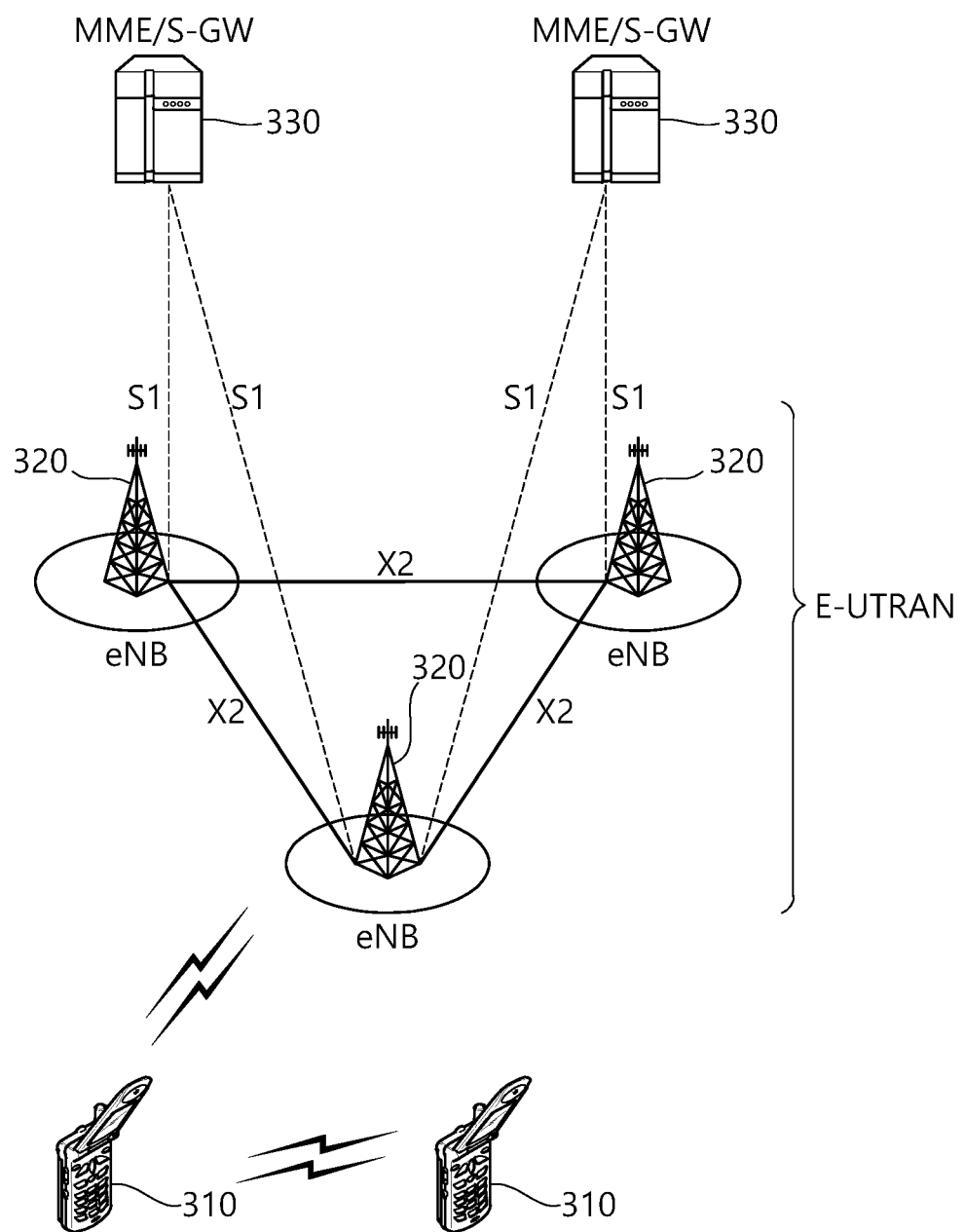
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
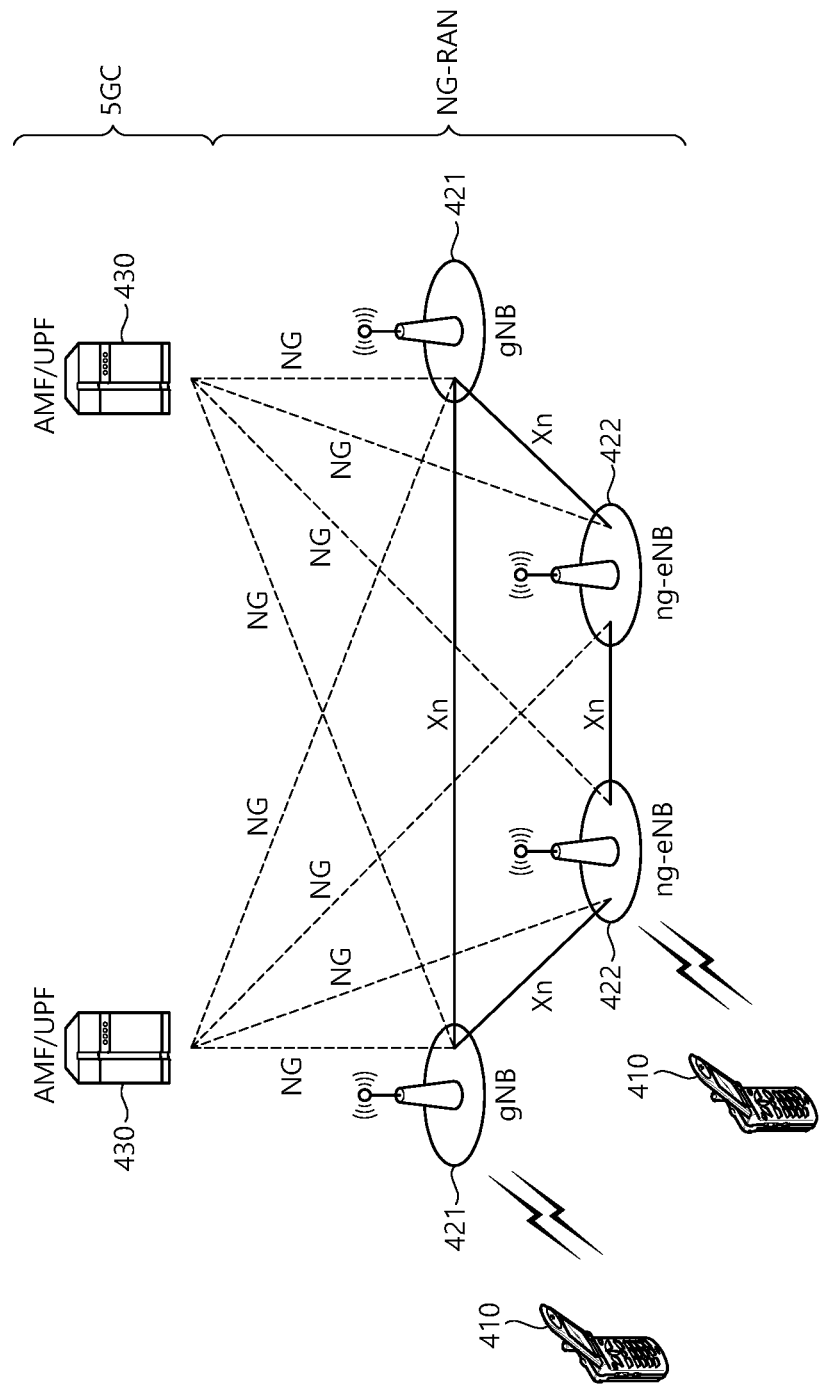
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
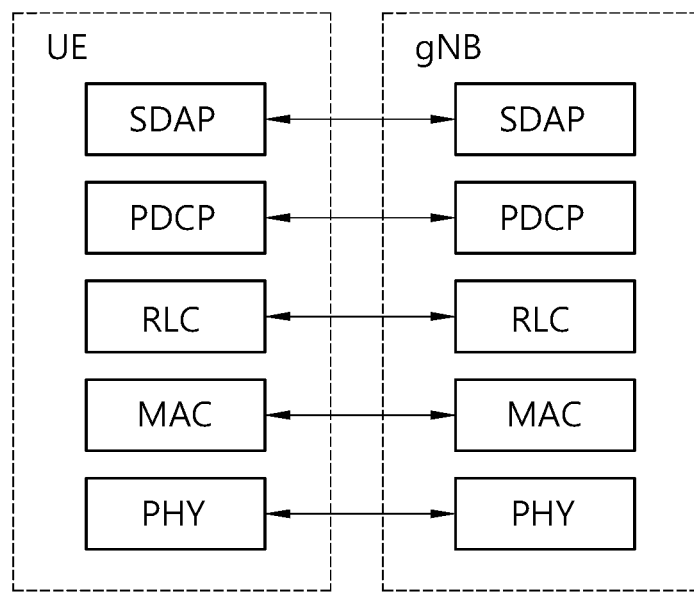
FIG. 5 shows a block diagram of a user plane protocol stack to which the technical features of the present disclosure can be applied.
Figure 6:
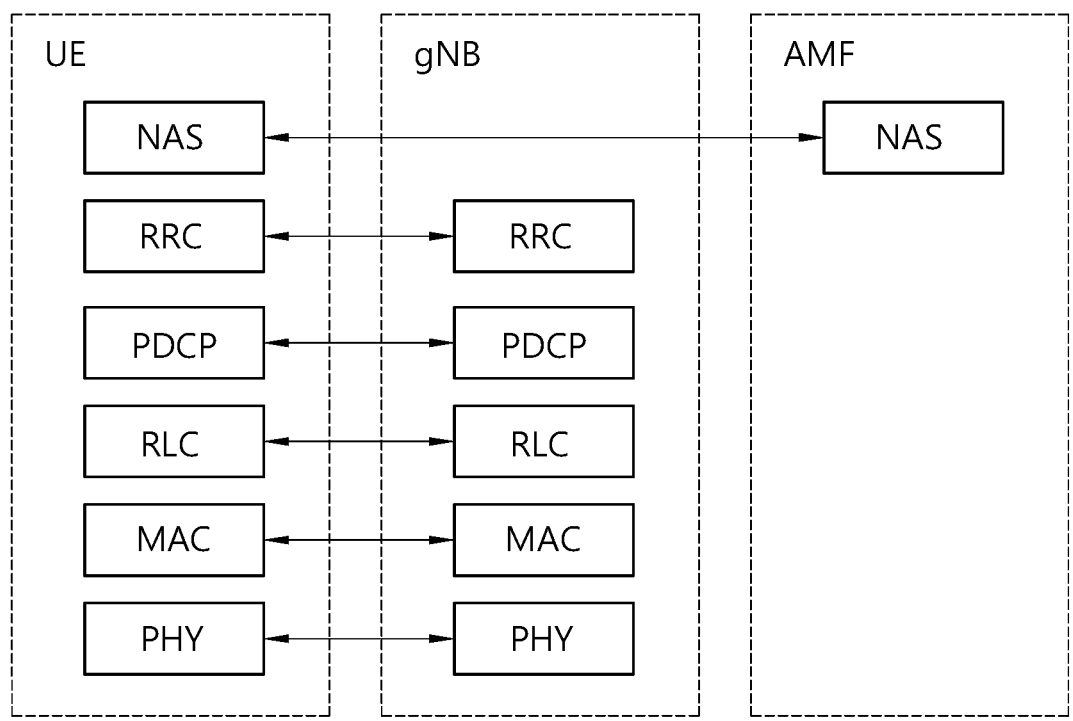
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Handover (HO) in 5G NR is described. Section 9.2.3.2 of 3GPP TS 38.300 V15.2.0 (2018 June) can be referred. The intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB.

Figure 7:
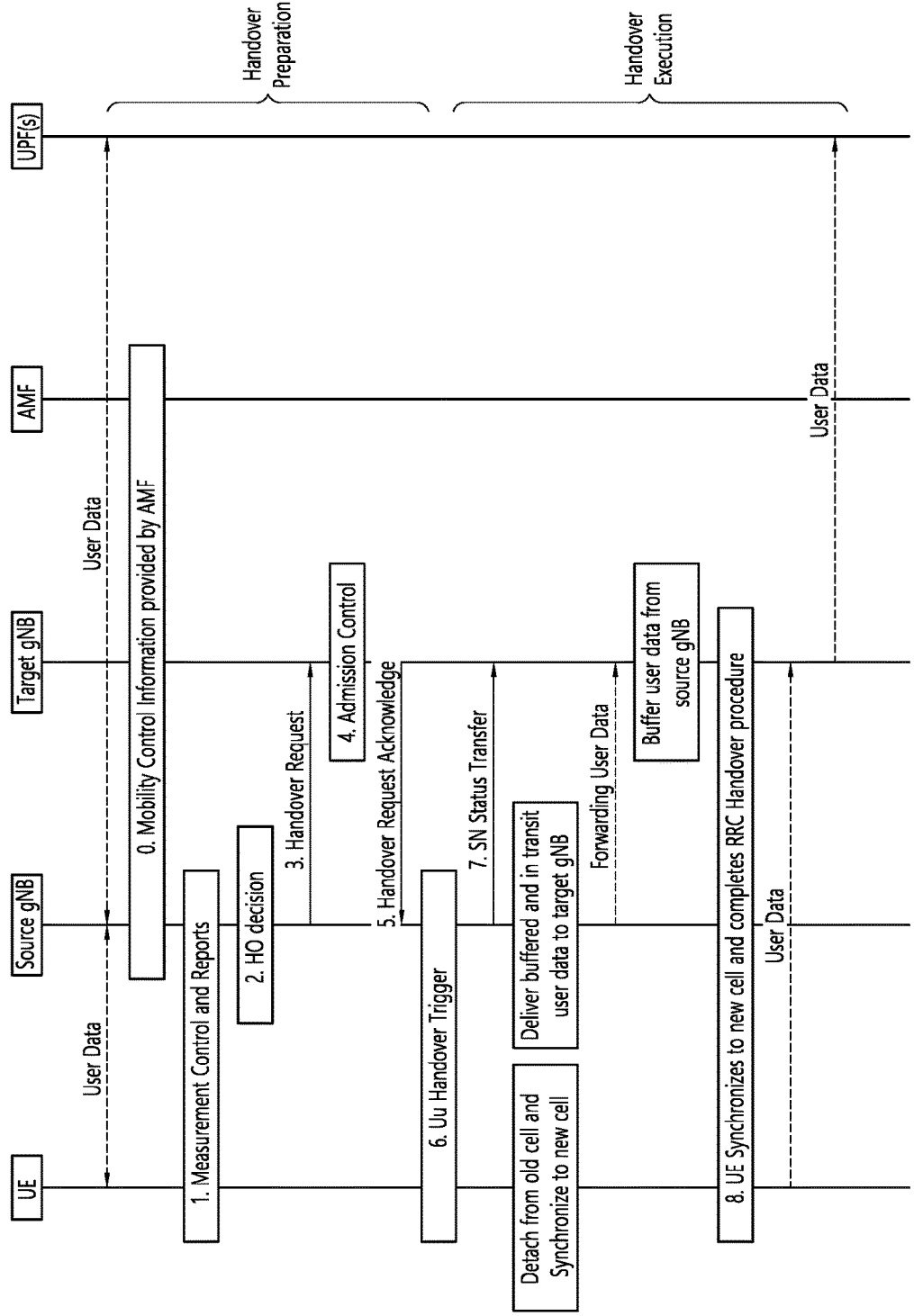
FIG. 7 shows basic intra-AMF/UPF handover scenario, i.e. where neither the AMF nor the UPF changes, to which the technical features of the present disclosure can be applied.

FIG. 7 shows basic intra-AMF/UPF handover scenario, i.e. where neither the AMF nor the UPF changes, to which the technical features of the present disclosure can be applied.

Only the preparation and execution phases of the handover procedure are described in FIG. 7. The complete phase of the handover procedure is not described in FIG. 7. The steps described in FIG. 7 can be applied to handover procedure in 5G LTE as well, without loss of generality.

Step 0: The UE context within the source gNB contains information regarding roaming and access restrictions which were provided either at connection establishment or at the last timing advance (TA) update.

Step 1: The source gNB configures the UE measurement procedures and the UE reports according to the measurement configuration.

Step 2: The source gNB decides to handover the UE, based on MeasurementReport and radio resource management (RRM) information.

Step 3: The source gNB issues a Handover Request message to the target gNB passing a transparent RRC container with necessary information to prepare the handover at the target side. The information includes at least the target cell ID, KgNB*, the cell radio network temporary identifier (C-RNTI) of the UE in the source gNB, RRM-configuration including UE inactive time, basic AS-configuration including antenna Info and DL Carrier Frequency, the current quality of service (QoS) flow to DRB mapping applied to the UE, the minimum system information from source gNB, the UE capabilities for different radio access technologies (RATs), PDU session related information, and can include the UE reported measurement information including beam-related information if available. The PDU session related information includes the slice information (if supported) and QoS flow level QoS profile(s).

Step 4: Admission control may be performed by the target gNB. Slice-aware admission control shall be performed if the slice information is sent to the target gNB. If the PDU sessions are associated with non-supported slices, the target gNB shall reject such PDU Sessions.

Step 5: The target gNB prepares the handover with L1/L2 and sends the Handover Request Acknowledge to the source gNB. The Handover Request Acknowledge message includes a transparent container to be sent to the UE as an RRC message to perform the handover.

Step 6: The source gNB triggers the Uu handover and sends the RRCReconfiguration message containing Handover Command message to the UE. The Handover Command message carries the information required to access the target cell, which includes at least the target cell ID, the new C-RNTI, the target gNB security algorithm identifiers for the selected security algorithms, can include a set of dedicated random access channel (RACH) resources, the association between RACH resources and synchronization signal (SS) blocks, the association between RACH resources and UE-specific channel state information reference signal (CSI-RS) configuration(s), common RACH resources, and target cell system information blocks (SIBs), etc.

Step 7: The source gNB sends the SN STATUS TRANSFER message to the target gNB.

Step 8: The UE synchronizes to the target cell and completes the RRC handover procedure by sending RRCReconfigurationComplete message to target gNB.

The RRM configuration can include both beam measurement information (for layer 3 mobility) associated to SS Block(s) and CSI-RS(s) for the reported cell(s) if both types of measurements are available. Also, if carrier aggregation (CA) is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SS block(s). The network can have dedicated RACH configurations associated to the SS block(s) and/or have dedicated RACH configurations associated to CSI-RS(s) within a cell. The target gNB can only include one of the following RACH configurations in the Handover Command to enable the UE to access the target cell:

i) Common RACH configuration;
ii) Common RACH configuration+Dedicated RACH configuration associated with SS-Block;
iii) Common RACH configuration+Dedicated RACH configuration associated with CSI-RS.

The UE continues to use the common RACH configuration of the source cell unless it is signaled in the Handover Command Message.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

RRC reconfiguration procedure is described. Section 5.3.5.1 of 3GPP TS 38.331 V15.2.0 (2018 June) can be referred. The purpose of this procedure is to modify an RRC connection, e.g. to establish/modify/release RBs, to perform reconfiguration with sync, to setup/modify/release measurements, to add/modify/release Secondary Cells (SCells) and cell groups. As part of the procedure, NAS dedicated information may be transferred from the Network to the UE.

In E-UTRA-NR Dual Connectivity (EN-DC), SRB3 can be used for measurement configuration and reporting to (re-)configure MAC, RLC, physical layer and Radio link Failure (RLF) timers and constants of the Secondary Cell Group (SCG) configuration, and to reconfigure PDCP for DRBs associated with the S-KgNB or SRB3, provided that the (re-)configuration does not require any MeNB involvement.

The Network may initiate the RRC reconfiguration procedure to a UE in RRC_CONNECTED. The network applies the procedure as follows.

the establishment of RBs (other than SRB1, that is established during RRC connection establishment) is performed only when AS security has been activated;
the addition of SCG and SCells is performed only when AS security has been activated;
the reconfigurationWithSync is included in secondary-CellGroup only when at least one DRB is setup in SCG.

Reconfiguration with sync is described. Section 5.3.5.5.2 of 3GPP TS 38.331 V15.2.0 (2018 June) can be referred. The UE shall perform the following actions to execute a reconfiguration with sync.

1> stop timer T310 for the corresponding Special Cell (SpCell), if running;
1> start timer T304 for the corresponding SpCell with the timer value set to t304, as included in the reconfigurationWithSync;
1> if the frequencyInfoDL is included:
2> consider the target SpCell to be one on the frequency indicated by the frequencyInfoDL with a physical cell identity indicated by the physCellId;
1> else:
2> consider the target SpCell to be one on the frequency of the source SpCell with a physical cell identity indicated by the physCellId;
1> start synchronizing to the DL of the target SpCell and acquire the MIB of the target SpCell;

The UE should perform the reconfiguration with sync as soon as possible following the reception of the RRC message triggering the reconfiguration with sync, which could be before confirming successful reception (HARQ and ARQ) of this message.

1> reset the MAC entity of this cell group;
1> consider the SCell(s) of this cell group, if configured, to be in deactivated state;
1> apply the value of the new UE-Identity as the C-RNTI for this cell group;
1> configure lower layers in accordance with the received spCellConfigCommon;
1> consider the bandwidth part indicated in firstActiveUplinkBWP-Id to be the active uplink bandwidth part;
1> consider the bandwidth part indicated in firstActiveDownlinkBWP-Id to be the active downlink bandwidth part;
1> configure lower layers in accordance with any additional fields, not covered in the previous, if included in the received reconfigurationWithSync.

The timer T304 is a timer related to the reconfiguration with sync. The T304 is used to determine whether the reconfiguration with sync, which may include handover, fails or not. As mentioned above, the T304 starts upon reception of RRCReconfiguration message including reconfigurationWithSync. The T304 stops upon successful completion of random access on the corresponding SpCell. For T304 of SCG, the T304 stops upon SCG release.

Upon T304 expiry, i.e., reconfiguration with sync failure (may include handover failure), the UE shall:
1> if T304 of a secondary cell group expires:
2> release rach-ContentionFree;
2> initiate the SCG failure information procedure to report SCG reconfiguration with sync failure, upon which the RRC reconfiguration procedure ends.

Measurements general is described. Section 5.5.1 of 3GPP TS 38.331 V15.2.0 (2018 June) can be referred.

The network may configure an RRC_CONNECTED UE to perform measurements and report them in accordance with the measurement configuration. The measurement configuration is provided by means of dedicated signaling i.e. using the RRCReconfiguration.

The network may configure the UE to perform the following types of measurements.
NR measurements;
Inter-RAT measurements of E-UTRA frequencies.

The network may configure the UE to report the following measurement information based on SS/Physical Broadcast Channel (PBCH) block(s).
Measurement results per SS/PBCH block;
Measurement results per cell based on SS/PBCH block(s);
SS/PBCH block(s) indexes.

The network may configure the UE to report the following measurement information based on Channel State Information Reference Signal (CSI-RS) resources.
Measurement results per CSI-RS resource;
Measurement results per cell based on CSI-RS resource(s);
CSI-RS resource measurement identifiers.

The measurement configuration includes the following parameters.

(1) Measurement objects (MOs): A list of objects on which the UE shall perform the measurements.
For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
The measObjectId of the MO which corresponds to each serving cell is indicated by servingCellMO within the serving cell configuration.
For inter-RAT E-UTRA measurements, a measurement object is a single EUTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

(2) Reporting configurations: A list of reporting configurations where there can be one or multiple reporting configurations per measurement object. Each reporting configuration consists of the following.
Reporting criterion: The criterion that triggers the UE to send a measurement report. This can either be periodical or a single event description.
Reference signal (RS) type: The RS that the UE uses for beam and cell measurement results (SS/PBCH block or CSI-RS).
Reporting format: The quantities per cell and per beam that the UE includes in the measurement report (e.g., Reference Signal Received Power (RSRP)) and other associated information such as the maximum number of cells and the maximum number beams per cell to report.

(3) Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

(4) Quantity configurations: The quantity configuration defines the measurement filtering configuration used for all event evaluation and related reporting of that measurement type. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

(5) Measurement gaps: Periods that the UE may use to perform measurements, i.e. no (UL, DL) transmissions are scheduled.

A UE in RRC_CONNECTED maintains a measurement object list, a reporting configuration list, and a measurement identities list according to signaling and procedures. The measurement object list possibly includes NR intra-frequency object(s), NR inter-frequency object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells.
(1) The NR serving cell(s)—these are the SpCell and one or more SCells.
(2) Listed cells—these are cells listed within the measurement object(s).
(3) Detected cells—these are cells that are not listed within the measurement object(s) but are detected by the UE on the SS/PBCH block frequency(ies) and subcarrier spacing(s) indicated by the measurement object(s).

For NR measurement object(s), the UE measures and reports on the serving cell(s), listed cells and/or detected cells.

Measurement reporting triggering is described. Section 5.5.4 of 3GPP TS 38.331 V15.2.0 (2018 June) can be referred.

If security has been activated successfully, the UE shall:
1> for each measId included in the measIdList within VarMeasConfig:
2> if the corresponding reportConfig includes a reportType set to eventTriggered or periodical;
3> if the corresponding measObject concerns NR;

4> if the eventA1 or eventA2 is configured in the corresponding reportConfig:
  5> consider only the serving cell to be applicable;
4> else:
  5> for events involving a serving cell associated with a measObjectNR and neighbours associated with another measObjectNR, consider any serving cell associated with the other measObjectNR to be a neighbouring cell as well;
    5> if useWhiteCellList is set to TRUE:
      6> consider any neighbouring cell detected based on parameters in the associated measObjectNR to be applicable when the concerned cell is included in the whiteCellsToAddModList defined within the VarMeasConfig for this measId;
    5> else:
      6> consider any neighbouring cell detected based on parameters in the associated measObjectNR to be applicable when the concerned cell is not included in the blackCellsToAddModList defined within the VarMeasConfig for this measId;
2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
  3> include a measurement reporting entry within the VarMeasReportList for this measId;
  3> set the numberOfReportsSent defined within the VarMeasReportList for this measId to 0;
  3> include the concerned cell(s) in the cellsTriggeredList defined within the VarMeasReportList for this measId;
  3> initiate the measurement reporting procedure;
2> if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
  3> set the numberOfReportsSent defined within the VarMeasReportList for this measId to 0;
  3> include the concerned cell(s) in the cellsTriggeredList defined within the VarMeasReportList for this measId;
  3> initiate the measurement reporting procedure;
2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
  3> remove the concerned cell(s) in the cellsTriggeredList defined within the VarMeasReportList for this measId;
  3> if reportOnLeave is set to TRUE for the corresponding reporting configuration:
    4> initiate the measurement reporting procedure;
  3> if the cellsTriggeredList defined within the VarMeasReportList for this measId is empty:
    4> remove the measurement reporting entry within the VarMeasReportList for this measId;
    4> stop the periodical reporting timer for this measId, if running;
2> if reportType is set to periodical and if a (first) measurement result is available:
  3> include a measurement reporting entry within the VarMeasReportList for this measId;
  3> set the numberOfReportsSent defined within the VarMeasReportList for this measId to 0;
  4> if the reportAmount exceeds 1:
    5> initiate the measurement reporting procedure, immediately after the quantity to be reported becomes available for the NR SpCell;
  4> else (i.e. the reportAmount is equal to 1):
    5> initiate the measurement reporting procedure, immediately after the quantity to be reported becomes available for the NR SpCell and for the strongest cell among the applicable cells;
2> upon expiry of the periodical reporting timer for this measId:
  3> initiate the measurement reporting procedure.

Event A1 is an event that serving cell quality becomes better than threshold. The UE shall:
1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the NR serving cell corresponding to the associated measObjectNR associated with this event.

$Ms - Hys > Thresh$      [Inequality A1-1](Entering condition)

$Ms + Hys < Thresh$      [Inequality A1-2](Leaving condition)

In the above inequalities, Ms is the measurement result of the serving cell, not taking into account any offsets. Hys is the hysteresis parameter for this event (i.e. hysteresis as defined within reportConfigNR for this event). Thresh is the threshold parameter for this event (i.e. a1-Threshold as defined within reportConfigNR for this event).

Event A2 is an event that serving cell quality becomes worse than threshold. The UE shall:
1> consider the entering condition for this event to be satisfied when condition A2-1, as specified below, is fulfilled;
1> consider the leaving condition for this event to be satisfied when condition A2-2, as specified below, is fulfilled;
1> for this measurement, consider the serving cell indicated by the measObjectNR associated to this event.

$Ms + Hys < Thresh$      [Inequality A2-1](Entering condition)

$Ms - Hys > Thresh$      [Inequality A2-2](Leaving condition)

In the above inequalities, Ms is the measurement result of the serving cell, not taking into account any offsets. Hys is the hysteresis parameter for this event (i.e. hysteresis as defined within reportConfigNR for this event). Thresh is the threshold parameter for this event (i.e. a2-Threshold as defined within reportConfigNR for this event).

Event A3 is an event that neighbour cell quality becomes offset better than SpCell quality. The UE shall:
1> consider the entering condition for this event to be satisfied when condition A3-1, as specified below, is fulfilled;
1> consider the leaving condition for this event to be satisfied when condition A3-2, as specified below, is fulfilled;

1> use the PSCell for Mp, Ofp and Ocp.

The cell(s) that triggers the event has reference signals indicated in the measObjectNR associated to this event which may be different from the NR SpCell measObjectNR.

$Mn+Ofn+Ocn-Hys>Mp+Ofp+Ocp+Off$ [Inequality A3-1](Entering condition)

$Mn+Ofn+Ocn+Hys<Mp+Ofp+Ocp+Off$ [Inequality A3-2](Leaving condition)

In the above inequalities, Mn is the measurement result of the neighbouring cell, not taking into account any offsets. Ofn is the measurement object specific offset of the reference signal of the neighbour cell (i.e. offsetMO as defined within measObjectNR corresponding to the neighbour cell). Ocn is the cell specific offset of the neighbour cell (i.e. cellIndividualOffset as defined within measObjectNR corresponding to the frequency of the neighbour cell), and set to zero if not configured for the neighbour cell. Mp is the measurement result of the SpCell, not taking into account any offsets. Ofp is the measurement object specific offset of the SpCell (i.e. offsetMO as defined within measObjectNR corresponding to the SpCell). Ocp is the cell specific offset of the SpCell (i.e. cellIndividualOffset as defined within measObjectNR corresponding to the SpCell), and is set to zero if not configured for the SpCell. Hys is the hysteresis parameter for this event (i.e. hysteresis as defined within reportConfigNR for this event). Off is the offset parameter for this event (i.e. a3-Offset as defined within reportConfigNR for this event).

Event A4 is an event that neighbour cell quality becomes better than threshold. The UE shall:

1> consider the entering condition for this event to be satisfied when condition A4-1, as specified below, is fulfilled;

1> consider the leaving condition for this event to be satisfied when condition A4-2, as specified below, is fulfilled.

$Mn+Ofn+Ocn-Hys>Thresh$ [Inequality A4-1](Entering condition)

$Mn+Ofn+Ocn+Hys<Thresh$ [Inequality A4-2](Leaving condition)

In the above inequalities, Mn is the measurement result of the neighbouring cell, not taking into account any offsets. Ofn is the measurement object specific offset of the neighbour cell (i.e. offsetMO as defined within measObjectNR corresponding to the neighbour cell). Ocn is the measurement object specific offset of the neighbour cell (i.e. cellIndividualOffset as defined within measObjectNR corresponding to the neighbour cell), and set to zero if not configured for the neighbour cell. Hys is the hysteresis parameter for this event (i.e. hysteresis as defined within reportConfigNR for this event). Thresh is the threshold parameter for this event (i.e. a4-Threshold as defined within reportConfigNR for this event).

Event A5 is an event that SpCell quality becomes worse than threshold1 and neighbour cell quality becomes better than threshold2. The UE shall:

1> consider the entering condition for this event to be satisfied when both condition A5-1 and condition A5-2, as specified below, are fulfilled;

1> consider the leaving condition for this event to be satisfied when condition A5-3 or condition A5-4, i.e. at least one of the two, as specified below, is fulfilled;

1> use the PSCell for Mp.

The parameters of the reference signal(s) of the cell(s) that triggers the event are indicated in the measObjectNR associated to the event which may be different from the measObjectNR of the NR SpCell.

$Mp+Hys<Thresh1$ [Inequality A5-1](Entering condition 1)

$Mn+Ofn+Ocn-Hys>Thresh2$ [Inequality A5-2](Entering condition 2)

$Mp-Hys>Thresh1$ [Inequality A5-3](Leaving condition 1)

$Mn+Ofn+Ocn+Hys<Thresh2$ [Inequality A5-4](Leaving condition 2)

In the above inequalities, Mp is the measurement result of the NR SpCell, not taking into account any offsets. Mn is the measurement result of the neighbouring cell, not taking into account any offsets. Ofn is the measurement object specific offset of the neighbour cell (i.e. offsetMO as defined within measObjectNR corresponding to the neighbour cell). Ocn is the cell specific offset of the neighbour cell (i.e. cellIndividualOffset as defined within measObjectNR corresponding to the neighbour cell), and set to zero if not configured for the neighbour cell. Hys is the hysteresis parameter for this event (i.e. hysteresis as defined within reportConfigNR for this event). Thresh1 is the threshold parameter for this event (i.e. a5-Threshold1 as defined within reportConfigNR for this event). Thresh2 is the threshold parameter for this event (i.e. a5-Threshold2 as defined within reportConfigNR for this event).

Event A6 is an event that neighbour cell quality becomes offset better than SCell quality. The UE shall:

1> consider the entering condition for this event to be satisfied when condition A6-1, as specified below, is fulfilled;

1> consider the leaving condition for this event to be satisfied when condition A6-2, as specified below, is fulfilled;

1> for this measurement, consider the (secondary) cell corresponding to the measObjectNR associated to this event to be the serving cell.

The reference signal(s) of the neighbour(s) and the reference signal(s) of the SCell are both indicated in the associated measObjectNR.

$Mn+Ocn-Hys>Ms+Ocs+Off$ [Inequality A6-1](Entering condition)

$Mn+Ocn+Hys<Ms+Ocs+Off$ [Inequality A6-2](Leaving condition)

In the above inequalities, Mn is the measurement result of the neighbouring cell, not taking into account any offsets. Ocn is the cell specific offset of the neighbour cell (i.e. cellIndividualOffset as defined within the associated measObjectNR), and set to zero if not configured for the neighbour cell. Ms is the measurement result of the serving cell, not taking into account any offsets. Ocs is the cell specific offset of the serving cell (i.e. cellIndividualOffset as defined within the associated measObjectNR), and is set to zero if not configured for the serving cell. Hys is the hysteresis parameter for this event (i.e. hysteresis as defined within reportConfigNR for this event). Off is the offset parameter for this event (i.e. a6-Offset as defined within reportConfigNR for this event).

Non-Terrestrial Network (NTN) is described. 3GPP RP-181370 and 3GPP TR 38.821 V0.1.0 (2018 September) can be referred. NTN refer to networks, or segments of networks, using an airborne or spaceborne vehicle for transmission.

Spaceborne vehicles may include satellites (including Low Earth Orbiting (LEO) satellites, Medium Earth Orbiting (MEO) satellites, Geostationary Earth Orbiting (GEO) satellites as well as Highly Elliptical Orbiting (HEO) satellites). LEO satellites orbit around the Earth with an altitude between 300 km, and 1500 km. MEO satellites orbit around the Earth above LEO and below geostationary Earth Orbit.

GEO satellites orbit at 35,786 km above the Earth's equator and following the direction of the Earth's rotation. An object in such an orbit has an orbital period equal to the Earth's rotational period and thus appears motionless, at a fixed position in the sky, to ground observers.

Airborne vehicles may include High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

Figure 8:
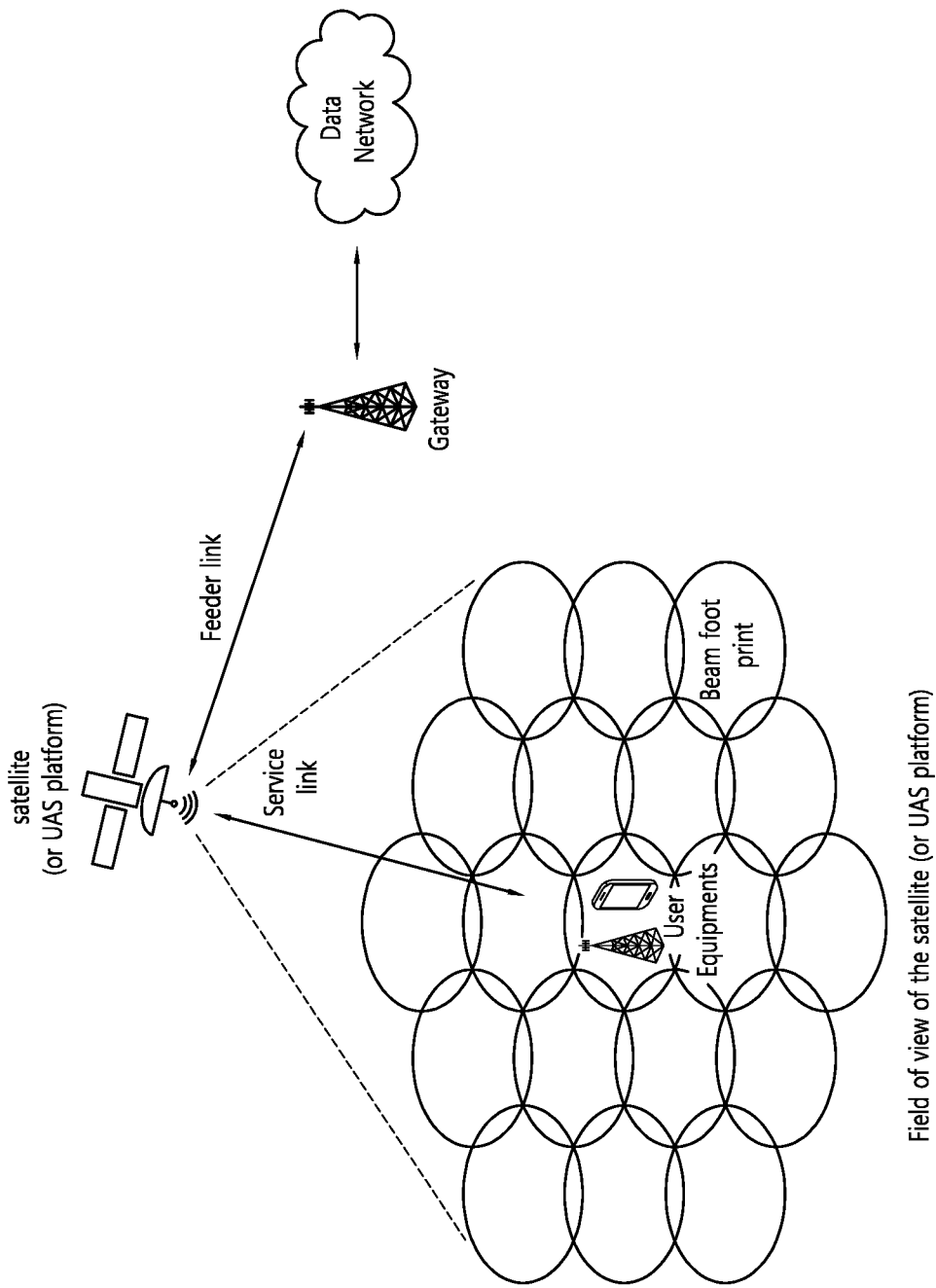
FIG. 8 shows an example of NTN typical scenario to which the technical features of the present disclosure can be applied.

FIG. 8 shows an example of NTN typical scenario to which the technical features of the present disclosure can be applied.

Referring to FIG. 8, NTN typically features the following elements.

(1) One or several sat-gateways that connect the NTN to a public data network
   A GEO satellite is fed by one or several sat-gateways which are deployed across the satellite targeted coverage (e.g. regional or even continental coverage). It may be assumed that UE in a cell are served by only one sat-gateway.
   A Non-GEO satellite served successively by one sat-gateway at a time: The system ensures service and feeder link continuity between the successive serving sat-gateways with sufficient time duration to proceed with mobility anchoring and handover.

(2) A Feeder link or radio link between a sat-gateway and the satellite (or UAS platform)

(3) A service link or radio link between the UE and the satellite (or UAS platform)

(4) A satellite (or UAS platform) which may implement either a transparent or a regenerative (with on board processing) payload: The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.
   A transparent payload: Radio frequency filtering, frequency conversion and amplification. Hence, the waveform signal repeated by the payload is un-changed.
   A regenerative payload: Radio frequency filtering, frequency conversion and amplification as well as demodulation/decoding, switch and/or routing, coding/modulation. This is effectively equivalent to having all or part of base station functions (e.g. gNB) on board the satellite (or UAS platform).

(5) Inter-satellite links (ISL) optionally in case of a constellation of satellites. This will require regenerative payloads on board the satellites. ISL may operate in RF frequency or optical bands.

(6) UEs are served by the satellite (or UAS platform) within the targeted service area.

Table 3 shows an example of different types of satellites (or UAS platforms).

TABLE 3

| Platforms | Altitude range | Orbit | Typical beam footprint size |
|---|---|---|---|
| LEO satellite | 300-1500 km | Circular around the earth | 100-500 km |
| MEO satellite | 7000-25000 km | | 100-500 km |
| GEO satellite | 35,786 km | notionalstation fixed in terms of elevation/azimuth with respect to a | 200-1000 km |
| UAS platform (including HAPS) | 8-50 km (20 km for HAPS) | | |

TABLE 3-continued

| Platforms | Altitude range | Orbit | Typical beam footprint size |
|---|---|---|---|
| | | given earth point keepingposition | 5-200 km |
| HEO satellite | 400-50000 km | Elliptical around the earth | 200-1000 km |

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

Table 4 shows propagation delays for GEO satellite at 35786 km.

TABLE 4

| | GEO at 35786 km | | |
|---|---|---|---|
| Elevation angle | Path | D (km) | Time (ms) |
| UE :10° | satellite - UE | 40586 | 135.286 |
| GW: 5° | satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite-UE | 40586 | 135.286 |
| Round Trip Time | Satellite-UE-Satellite | 81172 | 270.572 |

There may be several issues that need to be addressed for NTN. As one of the several issues, propagation delay may be considered. Naturally, the satellite systems may feature much larger propagation delays than terrestrial systems. As mentioned in Table 4 above, the one-way delay between the UE and the RAN (whether on-board the satellite/HAPS or on the ground) may reach up to 272.385 ms for GEO satellite. Even though not mentioned in Table 4 above, the one-way delay between the UE and the RAN (whether on-board the satellite/HAPS or on the ground) may be greater than 14.2 ms for non-GEO satellite. It means that round trip time (RTT) between the UE and the gNB (satellite) could be over 540 ms for GEO satellite as the worst scenario. This is significant issue to consider, given that the maximum propagation delay allowed for terrestrial systems is 10 ms (in case of 5G, <1 ms).

The propagation delay mentioned above may cause providing invalid configuration if the network applies user's input, such as measurement reporting, UE (assistant) information, etc., to the RRC (Re-) configuration. The most important scenario is mobility. The network supports the mobility (e.g., HO) based on the measurement report transmitted from the UE. Because, in NTN, UE with maximum 1000 km velocity is considered including aerial service, radio quality can be drifty deviated especially in the case of moving Line-Of-Sight (LOS) area to Non-LOS (NLOS) area or vice versa. In this kind of scenarios, even though the network provides a handover command upon receiving the measurement report from the UE based on e.g., entering event A3 mentioned above, the cell which was satisfied with the entering event A3 may leave the event A3 when the handover command is received by the UE.

Following cases could be possible to become invalid handover command to the UE.

(1) Upon measurement reporting, serving cell quality becomes good

In this case, the UE may perform measurement reporting based on e.g., entering event A3, and the network may provide RRC Reconfiguration including handover command after over 500 ms. During the delay time of over 500 ms, the serving cell quality may become good so that leaving condition of the event is satisfied.

(2) Upon measurement reporting, target cell quality becomes bad

In this case, the UE may perform measurement reporting based on e.g., entering event A3, and the network may provide RRC Reconfiguration including handover command after over 500 ms. During the delay time of over 500 ms, the target cell quality may become bad so that leaving condition of the event is satisfied.

(3) Upon measurement reporting, another cell becomes good

In this case, the UE may perform measurement reporting based on e.g., entering event A3, and the network may provide RRC Reconfiguration including handover command after over 500 ms. During the delay time of 500 ms, the UE may detect another cell which is better than the target cell to move.

The above mentioned scenarios may come together. Especially, in case (2) above, considering that the target cell is going worse, the handover may fail with higher possibility than terrestrial cases.

Figure 9:
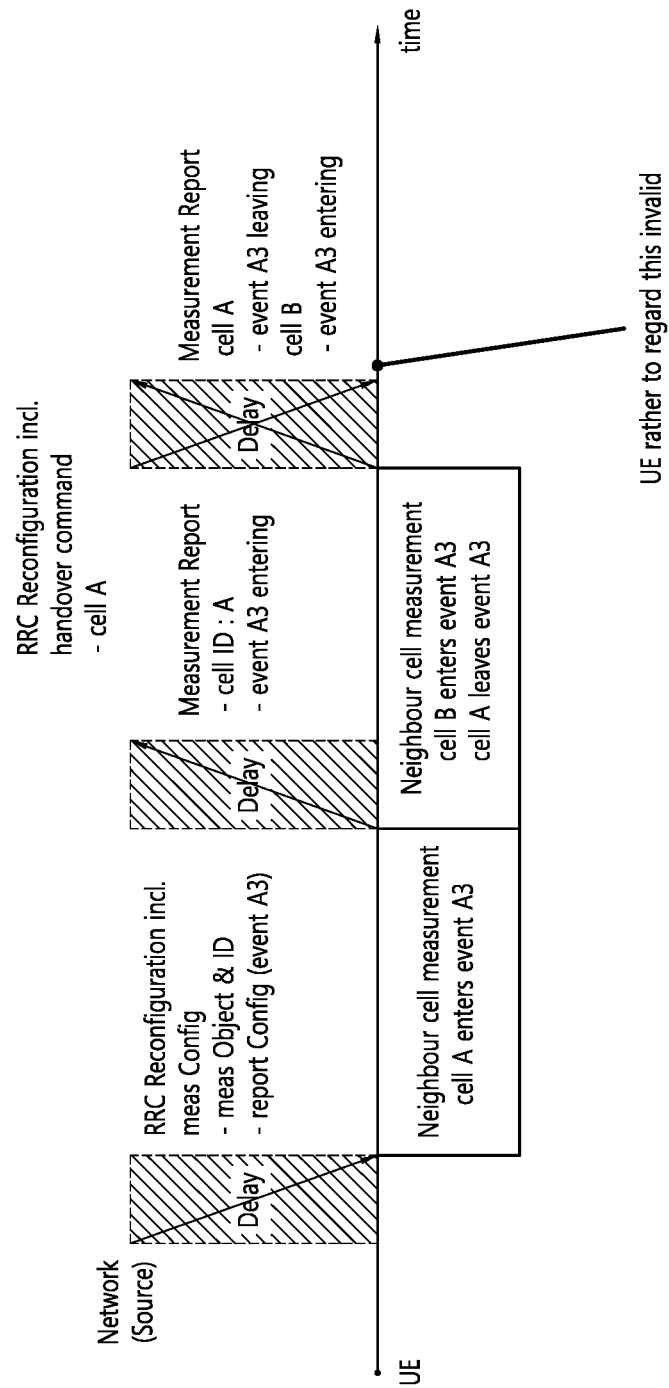
FIG. 9 shows an example of propagation delay problem in NTN.

FIG. 9 shows an example of propagation delay problem in NTN.

Referring to FIG. 9, the interaction between the network (i.e., serving cell) and the UE is as follows.

The UE receives a RRC Reconfiguration message including a measurement configuration. The measurement configuration includes configuration of measurement objects and measurement identities. The measurement configuration includes a measurement reporting configurations regarding e.g., event A3. There may be delay, e.g., up to 270 ms, between transmission by the network and reception by the UE.

The UE performs neighbor cell measurements. As a result of neighbor cell measurement, it is determined that neighbor cell A satisfies entering condition of event A3. The UE performs measurement reporting to the network (i.e., measurement reporting #1). The measurement reporting includes information that the neighbor cell A enters event A3. There may be delay, e.g., up to 270 ms, between transmission by the UE and reception by the network.

In the meantime before receiving a handover command from the network, the UE continuously performs neighbor cell measurements. As a result of neighbor cell measurement, it is determined that the neighbor cell A satisfies leaving condition of event A3, and instead neighbor cell B satisfies entering condition of event A3. The UE performs measurement reporting to the network (i.e., measurement reporting #2). The measurement reporting includes information that the neighbor cell A leaves event A3 and the neighbor cell B enters event A3. There may be delay, e.g., up to 270 ms, between transmission by the UE and reception by the network.

Before receiving the measurement reporting #2 from the UE, the network may transmit a RRC Reconfiguration message including a handover command which commands handover to the neighbor cell A based on the measurement reporting #1. However, upon receiving the handover command which commands handover to the neighbor cell A, because the neighbor cell A already leaves event A3 (i.e., quality of the neighbor cell A becomes worse), the UE may regard the handover command as invalid.

In other words, mobility support for UEs in NTN needs to be considered. As mentioned above, improper mobility command may be provided due to cell measurement state change caused by propagation delay. Therefore, there may be a problem that can cause unnecessary data service delays due to mobility failure.

Figure 10:
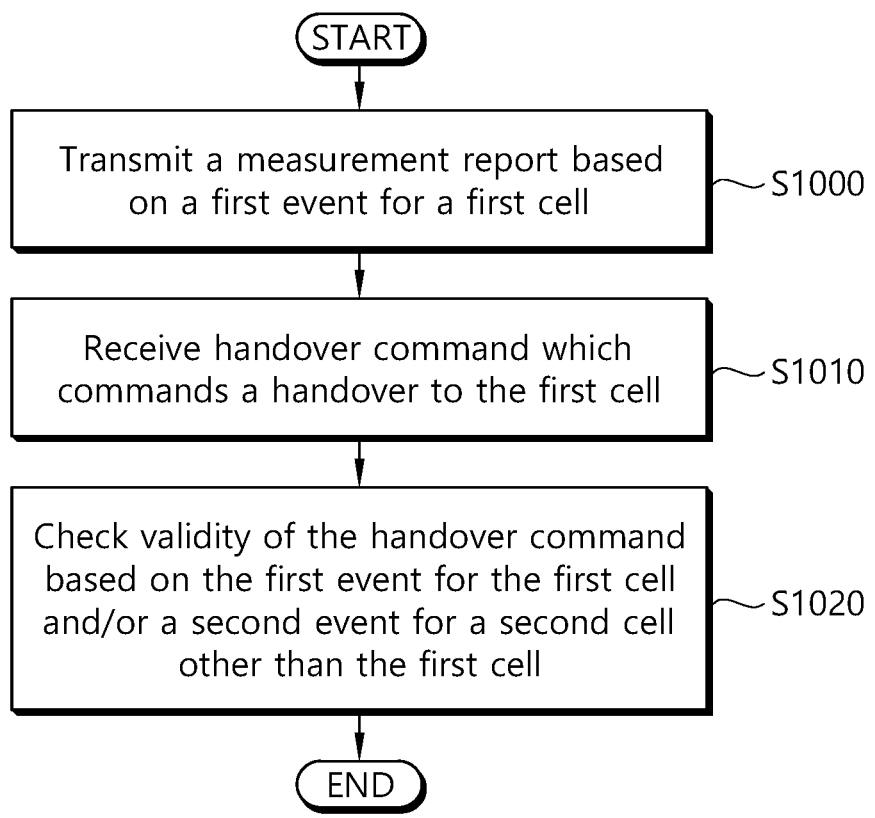
FIG. 10 shows an example of a method for handling signaling delay for handover according to an embodiment of the present disclosure.

FIG. 10 shows an example of a method for handling signaling delay for handover according to an embodiment of the present disclosure.

The wireless device may be in communication with at least one of a mobile device, a network, and/or autonomous vehicles other than the wireless device.

In step S1000, the wireless device transmits a measurement report based on a first event for a first cell.

In some implementations of the present disclosure, when the wireless device is in RRC_CONNECTED on a source cell of the handover, the wireless device may receive a measurement configuration. The measurement configuration may be received via an RRC (re-)configuration message. The measurement configuration may intend to be used for the handover. That is, upon receiving the measurement report which was obtained from neighbor cell measurement based on the measurement configuration from the wireless device, the network may apply/initiate the handover based on the received measurement report.

In some implementations of the present disclosure, the measurement configuration may include information on the first event for the first cell. Furthermore, the measurement configuration may include information on a second event for a second cell other than the second cell. The first cell may be a target cell of the handover. The second cell may be another neighbor cell other than the target cell of the handover. The first event and/or the second event may be any one of event A1, A2, A3, A4, A5 and/or A6. The measurement configuration may optionally include information on a new validity timer. The new validity timer may be used to detect invalid (i.e., not proper) configuration due to signaling delay.

In some implementations of the present disclosure, the network may optionally provide resume identity to reduce data latency when the configuration becomes invalid.

In some implementations of the present disclosure, upon receiving the measurement configuration from the source cell, the wireless device may perform neighbor cell measurement based on the measurement configuration and transmit the measurement report. The measurement report may include information for a cell for which an event triggering condition is considered to be satisfied based on results of the neighbor cell measurement. If the information on the new validity timer is provided to the wireless device, whenever the measurement report is transmitted, the new validity timer may start.

In step S1010, the wireless device receives a handover command which commands a handover to the first cell. The handover command may be received via an RRC (re-)configuration message from the network.

In step S1020, the wireless device checks validity of the handover command based on the first event for the first cell and/or a second event for a second cell other than the first cell.

In some implementations of the present disclosure, the received handover command may be considered not to be valid (i.e., not proper) configuration when at least one of the following conditions are met. The following conditions may be related to measurement status change.

If the wireless device has already reported another cell (e.g., second cell) for which another event triggering condition (e.g., the second event) is satisfied based on the updated measurement results and the wireless device considers the another cell is better to move than the target cell (e.g., the first cell) of handover, and/or If the wireless device is about to report another cell (e.g., second cell) for which another event triggering condition is satisfied based on the updated measurement results and the wireless device considers the another cell is better to move than the target cell (e.g., the first cell) of handover, and/or If the wireless device has already reported that a leaving condition for the triggered event (e.g., the first event) for the target cell (e.g., the first cell) of the handover is now satisfied, and/or If the wireless device is about to report that a leaving condition for the triggered event (e.g., the first event) for the target cell (e.g., the first cell) of the handover is now satisfied, and/or If the new validity timer is still ruing and at least one of the above conditions is met.

In other words, it may be checked that the handover command is invalid based on a leaving condition for the first event being satisfied for the first cell. Alternatively and/or additionally, it may be checked that the handover command is invalid based on an entering condition for the second event being satisfied for the second cell and consideration that the second cell is better to move than the first cell. Alternatively and/or additionally, it may be checked that the handover command is invalid based on a validity timer being running.

In some implementations of the present disclosure, upon considering the received handover command as invalid, the wireless device may perform at least one of the following operations.

(1) The wireless device may declare RLF based on invalidity of the handover command as a result of the checking validity of the handover command. The wireless device may perform a (RRC) re-establishment procedure or a (RRC) resume procedure after declaring the RLF.

In some implementations of the present disclosure, if the wireless device has received the resume identity from the network, the wireless device may be able to perform RRC resume procedure. Otherwise, the wireless device may perform RRC re-establishment procedure.

In some implementations of the present disclosure, during performing the RRC re-establishment procedure or RRC resume procedure, the wireless device may not perform cell search and may directly access to another cell which is measured after the first measurement reporting. For example, if another cell (e.g., second cell) for which another event triggering condition (e.g., the second event) is satisfied based on the updated measurement results and the wireless device considers the another cell is better to move than the target cell (e.g., the first cell) of handover, the wireless device may directly access to another cell without performing cell search.

This approach may be appropriate if the source base station is of poor quality.

In summary, since moving towards invalid target cell would cause handover failure with high possibility, triggering re-establishment procedure could be a simple solution to resolve the problem. While performing re-establishment procedure, the wireless device may indicate the propagation delay problem via MSG3 or MSG5. However additional propagation delay may happen while the wireless device performs re-establishment procedure.

(2) The wireless device may reject the handover command based on invalidity of the handover command as a result of the checking validity of the handover command, and the handover to the first cell may not be performed. The wireless device may transmit information informing that the handover to the first cell is not performed to a network. The information may be used to inform that the received handover command is invalid. The information may be transmitted via an RRC (re-)configuration complete message to the source cell.

In other words, without mobility, the wireless device may send reconfiguration complete message with indication to inform the problem to the source cell.

This approach may be appropriate if the target base station is no longer valid and the source base station is not of poor quality.

(3) The wireless device may perform the handover to the first cell based on the handover command, and transmit information informing that the first cell is no more proper to stay. That is, the wireless device may perform the handover to the first cell regardless of invalidity of the handover command. The information may be used to inform that the received handover command is invalid. The information may be transmitted via an RRC (re-)configuration complete message to the target cell.

In other words, after mobility towards the target cell, the wireless device may send reconfiguration complete message with indication to inform the problem to the target cell. Since the basic principle of behavior of the wireless device is that the wireless device is always supposed to comply the network's configuration, this solution may keep the principle as is. However, in some cases of the above, the target cell may become no longer to be proper cell to move so that the mobility cause handover failure with high possibility since the target cell regards invalid already.

Figure 11:
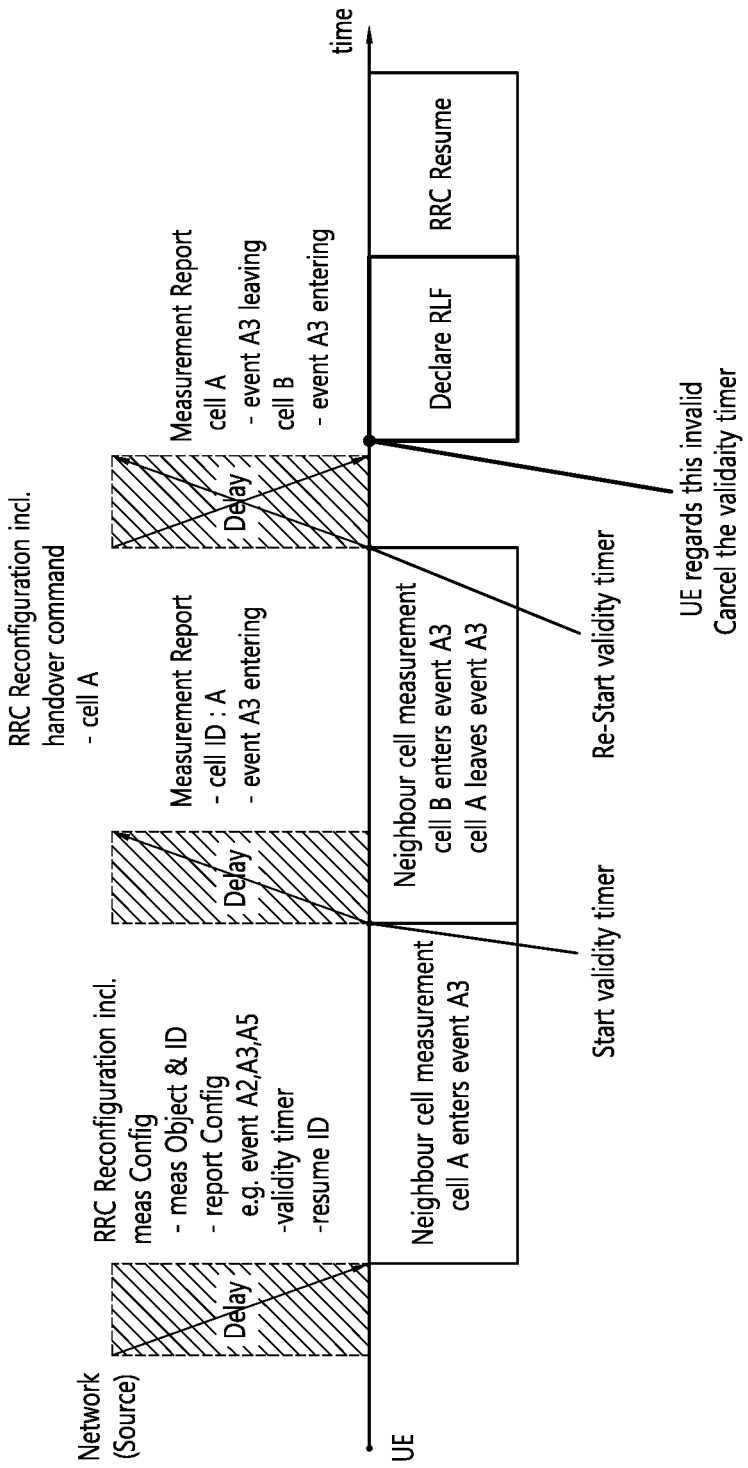
FIG. 11 shows another example of a method for handling signaling delay for handover according to an embodiment of the present disclosure.

FIG. 11 shows another example of a method for handling signaling delay for handover according to an embodiment of the present disclosure.

In some implementations of the present disclosure, the wireless device is connecting to a network, source cell e.g., gNB, eNB.

In some implementations of the present disclosure, the source cell decides that the wireless device needs to prepare handover procedure because signaling quality between the source cell and the wireless device is getting worse. The source cell may provide measurement configuration to receive measurement report from the wireless device. Considering propagation delay between the source cell and the wireless device, the source cell may also provide a new validity timer and resume identity optionally.

In some implementations of the present disclosure, the wireless device receives RRC message, e.g., RRC Reconfiguration message, including the measurement configuration from the source cell. To decide the most proper cell to handover, the source cell may configure the wireless device in the measurement configuration with one more event condition for the given carrier frequency, e.g., event A3.

In some implementations of the present disclosure, upon receiving the measurement configuration, the wireless device may perform neighbor cell measurement based on the measurement configuration. The wireless device may confirm that cell A is satisfied with the entering condition of event A3 during the timer-to-trigger defined for the event A3. The wireless device may decide the cell A to report entering event A3. The wireless device may transmit measurement report message including that the cell A enters event A3 to the source cell. The wireless device may start the new validity timer if available.

In some implementations of the present disclosure, the source cell receives measurement report message for the cell A from the wireless device, and prepare handover procedure from the source cell to the cell A. For this, handover request and confirm may be exchanged between the source cell and the cell A.

In some implementations of the present disclosure, while the network prepares handover procedure, the wireless device may keep performing neighbor cell measurement based on the measurement configuration. Then, the wireless device may confirm that the cell A is satisfied with the leaving condition of event A3 during the timer-to-trigger defined for the event A3. The wireless device may decide the cell A to report leaving event A3. Also, the wireless device may confirm that the cell B is now satisfied with the entering condition of event A3 during the timer-to-trigger defined for the event A3. The UE may decide the cell B to report entering event A3. The wireless device may transmit measurement report message including that the cell A leaves event A3 and the cell B enters event A3 to the source cell. The wireless device may re-start the new validity timer if available.

In some implementations of the present disclosure, after handover preparation, the source cell transmits a handover command which commands handover to the cell A, before receiving the updated measurement report message including that the cell A leaves event A3 (i.e., the cell A is no more proper cell to perform the handover) from the wireless device due to propagation delay. The handover command may be transmitted via RRC message e.g., RRC reconfiguration message.

In some implementations of the present disclosure, upon receiving the handover command via the RRC message e.g., RRC reconfiguration message, the wireless device may regard the handover command invalid because the new validity timer is still running which means that the received RRC message is not considered the latest measurement report. The wireless device may cancel the new validity timer. The wireless device may perform at least one of the following procedures.

(1) Declaring RLF

The wireless device may declare RLF and search a new cell to access. If the wireless device receives resume identity previously, the RRC resume procedure may be performed. For the cell search procedure, the UE may be able to try to access to the cell B without additional neighbor cell measurement procedure because the cell B is satisfied with entering condition of event A3.

(2) Rejection of the Handover Command

The wireless device may not comply the RRC message including the handover command. The wireless device may send RRC message, e.g., RRC reconfiguration complete message, to the source cell to indicate that the wireless device does not perform the handover to the cell A. The wireless device may set new information to indicate invalid handover in the RRC message.

(3) Indication after Handover

The wireless device may perform handover to the cell A and after handover completion, the wireless device send RRC message, e.g., RRC reconfiguration complete message, to the cell A to indicate that the cell A is no more proper to stay. The wireless device may set new information to indicate invalid handover in the RRC message.

Figure 12:
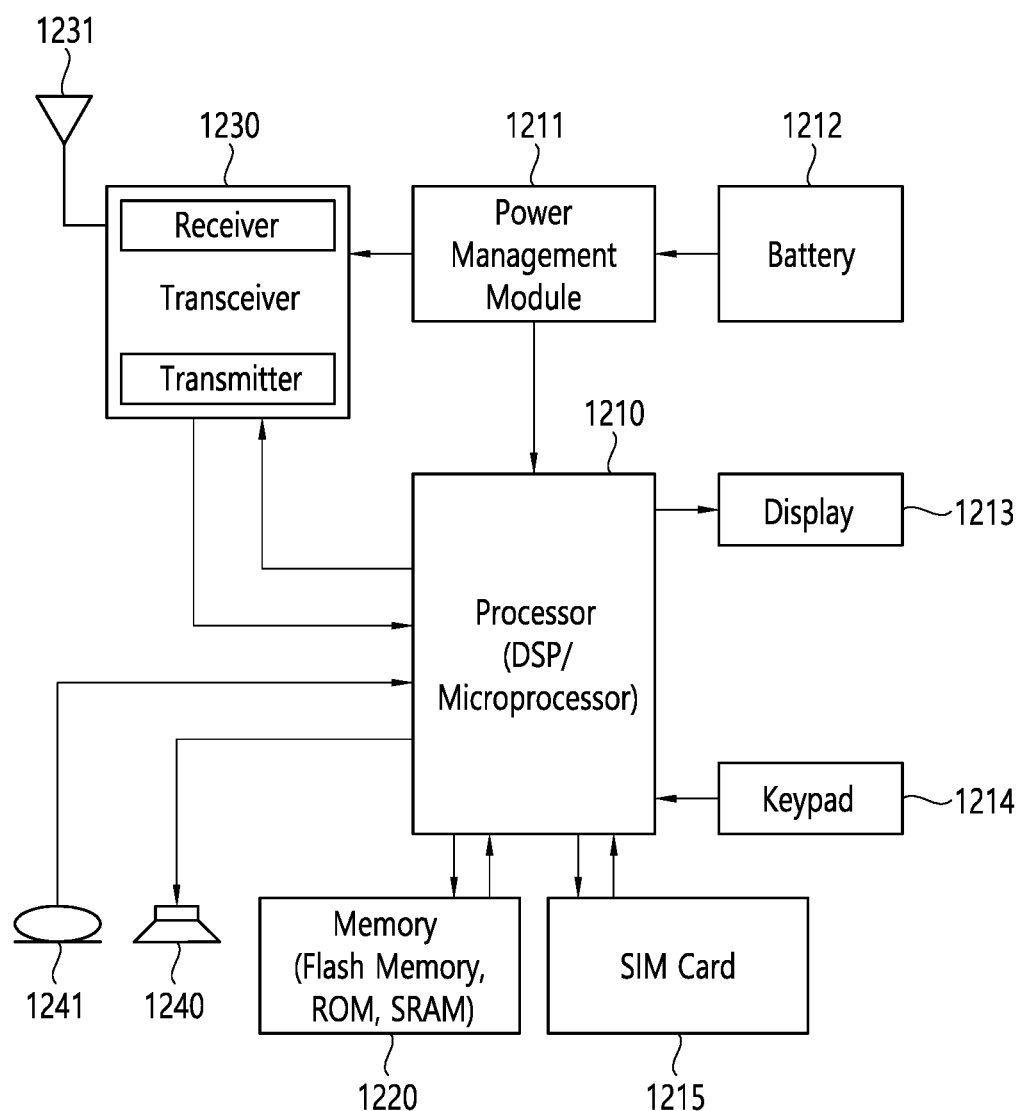
FIG. 12 shows a UE to which the technical features of the present disclosure can be applied.

FIG. 12 shows a UE to which the technical features of the present disclosure can be applied.

A UE includes a processor 1210, a power management module 1211, a battery 1212, a display 1213, a keypad 1214, a subscriber identification module (SIM) card 1215, a memory 1220, a transceiver 1230, one or more antennas 1231, a speaker 1240, and a microphone 1241.

The processor 1210 may be configured to implement proposed functions, procedures and/or methods described in this description. Layers of the radio interface protocol may be implemented in the processor 1210. The processor 1210 may include application-specific integrated circuit (ASIC), other chipset, logic circuit and/or data processing device. The processor 1210 may be an application processor (AP). The processor 1210 may include at least one of a digital signal processor (DSP), a central processing unit (CPU), a graphics processing unit (GPU), a modem (modulator and demodulator). An example of the processor 1210 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1210 may be configured to perform the steps described in FIG. 10 (i.e., steps S1000 to S1020). Alternatively, the processor 1210 may be configured to control the memory 1220 and/or the transceiver 1230 to perform the steps described in FIG. 10 (i.e., steps S1000 to S1020).

The power management module 1211 manages power for the processor 1210 and/or the transceiver 1230. The battery 1212 supplies power to the power management module 1211. The display 1213 outputs results processed by the processor 1210. The keypad 1214 receives inputs to be used by the processor 1210. The keypad 1214 may be shown on the display 1213. The SIM card 1215 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1220 is operatively coupled with the processor 1210 and stores a variety of information to operate the processor 1210. The memory 1220 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1220 and executed by the processor 1210. The memory 1220 can be implemented within the processor 1210 or external to the processor 1210 in which case those can be communicatively coupled to the processor 1210 via various means as is known in the art.

The transceiver 1230 is operatively coupled with the processor 1210, and transmits and/or receives a radio signal. The transceiver 1230 includes a transmitter and a receiver.

The transceiver 1230 may include baseband circuitry to process radio frequency signals. The transceiver 1230 controls the one or more antennas 1231 to transmit and/or receive a radio signal.

The speaker 1240 outputs sound-related results processed by the processor 1210. The microphone 1241 receives sound-related inputs to be used by the processor 1210.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 13:
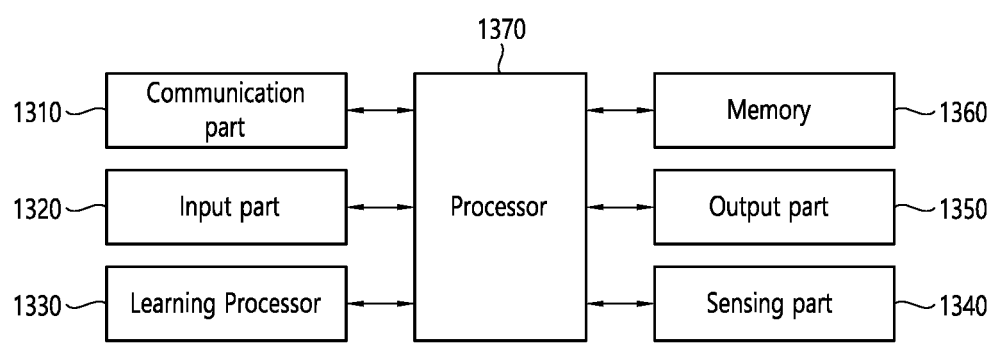
FIG. 13 shows an example of an AI device to which the technical features of the present disclosure can be applied.

FIG. 13 shows an example of an AI device to which the technical features of the present disclosure can be applied.

The AI device 1300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 13, the AI device 1300 may include a communication part 1310, an input part 1320, a learning processor 1330, a sensing part 1340, an output part 1350, a memory 1360, and a processor 1370.

The communication part 1310 can transmit and/or receive data to and/or from external devices such as the AI devices and the AI server using wire and/or wireless communication technology. For example, the communication part 1310 can transmit and/or receive sensor information, a user input, a learning model, and a control signal with external devices. The communication technology used by the communication part 1310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1320 can acquire various kinds of data. The input part 1320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1320 can acquire input data to be used when acquiring an output using learning data and a learning model for model learning. The input part 1320 may obtain raw input data, in which case the processor 1370 or the learning processor 1330 may extract input features by preprocessing the input data.

The learning processor 1330 may learn a model composed of an ANN using learning data. The learned ANN can be referred to as a learning model. The learning model can be used to infer result values for new input data rather than learning data, and the inferred values can be used as a basis for determining which actions to perform. The learning processor 1330 may perform AI processing together with the learning processor of the AI server. The learning processor 1330 may include a memory integrated and/or implemented in the AI device 1300. Alternatively, the learning processor 1330 may be implemented using the memory 1360, an external memory directly coupled to the AI device 1300, and/or a memory maintained in an external device.

The sensing part 1340 may acquire at least one of internal information of the AI device 1300, environment information of the AI device 1300, and/or the user information using various sensors. The sensors included in the sensing part 1340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1350 may generate an output related to visual, auditory, tactile, etc. The output part 1350 may include a display unit for outputting visual information, a speaker for outputting auditory information, and/or a haptic module for outputting tactile information.

The memory 1360 may store data that supports various functions of the AI device 1300. For example, the memory 1360 may store input data acquired by the input part 1320, learning data, a learning model, a learning history, etc.

The processor 1370 may determine at least one executable operation of the AI device 1300 based on information determined and/or generated using a data analysis algorithm and/or a machine learning algorithm. The processor 1370 may then control the components of the AI device 1300 to perform the determined operation. The processor 1370 may request, retrieve, receive, and/or utilize data in the learning processor 1330 and/or the memory 1360, and may control the components of the AI device 1300 to execute the predicted operation and/or the operation determined to be desirable among the at least one executable operation. The processor 1370 may generate a control signal for controlling the external device, and may transmit the generated control signal to the external device, when the external device needs to be linked to perform the determined operation. The processor 1370 may obtain the intention information for the user input and determine the user's requirements based on the obtained intention information. The processor 1370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1330 and/or learned by the learning processor of the AI server, and/or learned by their distributed processing. The processor 1370 may collect history information including the operation contents of the AI device 1300 and/or the user's feedback on the operation, etc. The processor 1370 may store the collected history information in the memory 1360 and/or the learning processor 1330, and/or transmit to an external device such as the AI server. The collected history information can be used to update the learning model. The processor 1370 may control at least some of the components of AI device 1300 to drive an application program stored in memory 1360. Furthermore, the processor 1370 may operate two or more of the components included in the AI device 1300 in combination with each other for driving the application program.

Figure 14:
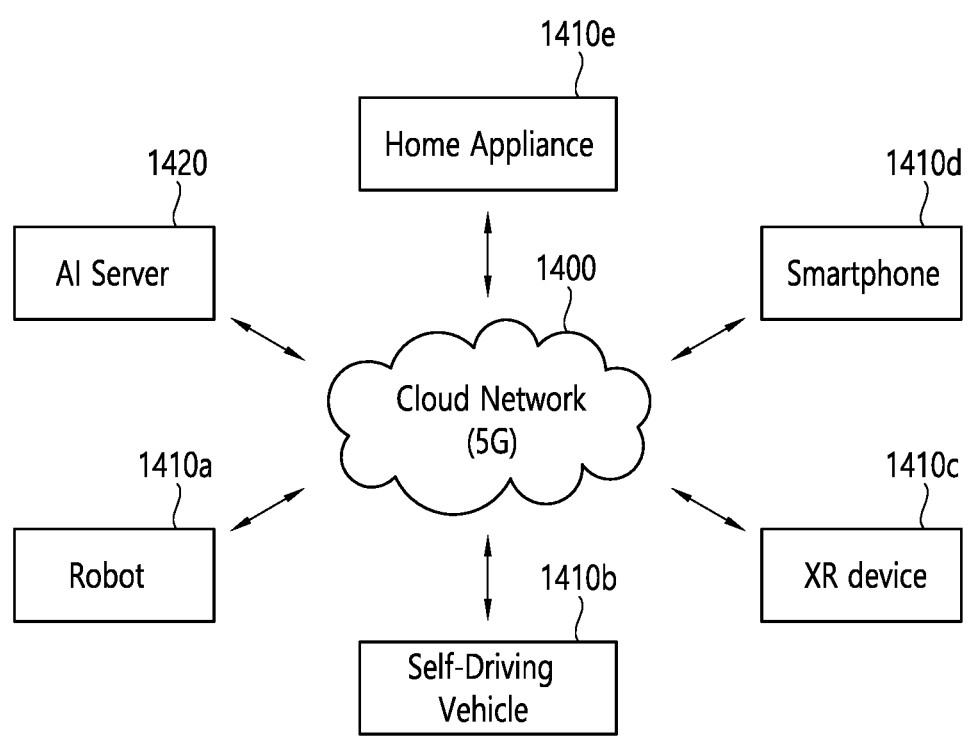
FIG. 14 shows an example of an AI system to which the technical features of the present disclosure can be applied.

FIG. 14 shows an example of an AI system to which the technical features of the present disclosure can be applied.

Referring to FIG. 14, in the AI system, at least one of an AI server 1420, a robot 1410a, an autonomous vehicle 1410b, an XR device 1410c, a smartphone 1410d and/or a home appliance 1410e is connected to a cloud network 1400. The robot 1410a, the autonomous vehicle 1410b, the XR device 1410c, the smartphone 1410d, and/or the home appliance 1410e to which the AI technology is applied may be referred to as AI devices 1410a to 1410e.

The cloud network 1400 may refer to a network that forms part of a cloud computing infrastructure and/or resides in a cloud computing infrastructure. The cloud network 1400 may be configured using a 3G network, a 4G or LTE network, and/or a 5G network. That is, each of the devices 1410a to 1410e and 1420 consisting the AI system may be connected to each other through the cloud network 1400. In particular, each of the devices 1410a to 1410e and 1420 may communicate with each other through a base station, but may directly communicate with each other without using a base station.

The AI server 1420 may include a server for performing AI processing and a server for performing operations on big data. The AI server 1420 is connected to at least one or more of AI devices constituting the AI system, i.e. the robot 1410a, the autonomous vehicle 1410b, the XR device 1410c, the smartphone 1410d and/or the home appliance 1410e through the cloud network 1400, and may assist at least some AI processing of the connected AI devices 1410a to 1410e. The AI server 1420 can learn the ANN according to the machine learning algorithm on behalf of the AI devices 1410a to 1410e, and can directly store the learning models and/or transmit them to the AI devices 1410a to 1410e. The AI server 1420 may receive the input data from the AI devices 1410a to 1410e, infer the result value with respect to the received input data using the learning model, generate a response and/or a control command based on the inferred result value, and transmit the generated data to the AI devices 1410a to 1410e. Alternatively, the AI devices 1410a to 1410e may directly infer a result value for the input data using a learning model, and generate a response and/or a control command based on the inferred result value.

Various embodiments of the AI devices 1410a to 1410e to which the technical features of the present disclosure can be applied will be described. The AI devices 1410a to 1410e shown in FIG. 14 can be seen as specific embodiments of the AI device 1300 shown in FIG. 13.

The present disclosure can have various advantageous effects.

For example, a wireless device can inform a network that a mobility to a cell which is no more applicable due to propagation delay is invalid.

For example, the wireless device can prevent additional handover failure by not perform mobility to a cell which is no more applicable to perform mobility.

For example, handover failure rate can be reduced and terminal service delay can be minimized by preventing improper mobility procedures due to propagation delays that can occur frequently due to satellite service.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:

connecting to a gNB which serves a serving cell;
receiving, from the gNB, a first radio resource control (RRC) reconfiguration message including a measurement configuration,
wherein the measurement configuration includes a configuration of one or more measurement reporting events;
performing first measurements for one or more neighbor cells based on the measurement configuration;
based on an entry condition applicable for a first measurement reporting event from among the one or more measurement reporting events being fulfilled for a first cell from among the one or more neighbor cells, transmitting, to the gNB, a measurement report including a result of the measurements for the first cell;
after transmitting the measurement report, performing second measurements for the one or more neighbor cells based on the measurement configuration;
determining a measurement status change based on the second measurements;
after determining the measurement status change, receiving, from the gNB, a second RRC reconfiguration message including a handover command which commands a handover of the wireless device to the first cell; and
considering the handover command invalid based on the measurement status change,
wherein the handover of the wireless device to the first cell is not performed based on the handover command being considered to be invalid.

2. The method of claim 1, further comprising declaring a radio link failure (RLF) based on the handover command being considered invalid.

3. The method of claim 2, further comprising performing a re-establishment procedure or a resume procedure after declaring the RLF.

4. The method of claim 1, further comprising rejecting the handover command based on the handover command being considered invalid.

5. The method of claim 4, further comprising:
transmitting, to the gNB, information informing that the handover of the wireless device to the first cell is not performed.

6. The method of claim 1, wherein the measurement status change includes a leaving condition applicable for the first measurement reporting event being fulfilled for the first cell.

7. The method of claim 1, wherein the measurement status change includes a second cell from among the one or more neighbor cells fulfilling a second measurement reporting event from among the one or more measurement reporting events being better than the first cell for the handover of the wireless device.

8. The method of claim 1, wherein the handover command is considered invalid based on a validity timer being running.

9. The method of claim 8, wherein the validity timer starts upon transmitting the measurement report.

10. The method of claim 1, wherein the wireless device is in communication with at least one of a mobile device, a network, and/or autonomous vehicles other than the wireless device.

11. A wireless device configured to operate in a wireless communication system, the wireless device comprising:
a transceiver;
a processor; and
a memory operably connectable to the processor and storing instructions that, based on being executed by the processor, perform operations comprising:
connecting to a gNB which serves a serving cell;
receiving, from the gNB via the transceiver, a first radio resource control (RRC) reconfiguration message including a measurement configuration,
wherein the measurement configuration includes a configuration of one or more measurement reporting events;
performing measurements for one or more neighbor cells based on the measurement configuration;
based on an entry condition applicable for a first measurement reporting event from among the one or more measurement reporting events being fulfilled for a first cell from among the one or more neighbor cells, transmitting, to the gNB, via the transceiver, a measurement report including a result of the measurements for the first cell;
after transmitting the measurement report, performing second measurements for the one or more neighbor cells based on the measurement configuration;
determining a measurement status change based on the second measurements;
after determining the measurement status change, receiving, from the gNB via the transceiver, a second RRC reconfiguration message including a handover command which commands a handover of the wireless device to the first cell; and
considering the handover command invalid based on the measurement status change,
wherein the handover of the wireless device to the first cell is not performed based on the handover command being considered to be invalid.

12. A processing apparatus configured to control a wireless device operating in a wireless communication system, the processing apparatus comprising:
a processor; and
a memory operably connectable to the processor, wherein the processor is configured to perform operations comprising:
connecting to a gNB which serves a serving cell;
obtaining a first radio resource control (RRC) reconfiguration message including a measurement configuration,
wherein the measurement configuration includes a configuration of one or more measurement reporting events;
performing first measurements for one or more neighbor cells based on the measurement configuration;
based on an entry condition applicable for a first measurement reporting event from among the one or more measurement reporting events being fulfilled for a first cell from among the one or more neighbor cells, generating a measurement report including a result of the measurements for the first cell;
after generating the measurement report, performing second measurements for the one or more neighbor cells based on the measurement configuration;
determining a measurement status change based on the second measurements;
after determining the measurement status change, obtaining a second RRC reconfiguration message including a handover command which commands a handover of the wireless device to the first cell; and
considering the handover command invalid based on the measurement status change, wherein the handover of the wireless device to the first cell is not performed based on the handover command being considered to be invalid.

* * * * *